C. L. BARKER.
CHECK VALVE.
APPLICATION FILED APR. 20, 1918.

1,297,312.

Patented Mar. 18, 1919.

INVENTOR
Charles L. Barker
BY
ATTORNEY

UNITED STATES PATENT OFFICE.

CHARLES L. BARKER, OF NORWALK, CONNECTICUT.

CHECK-VALVE.

1,297,312.  Specification of Letters Patent.  Patented Mar. 18, 1919.

Application filed April 20, 1918. Serial No. 229,705.

*To all whom it may concern:*

Be it known that I, CHARLES L. BARKER, a citizen of the United States, residing at Norwalk, county of Fairfield, State of Connecticut, have invented an Improvement in Check-Valves, of which the following is a specification.

This invention relates to check valves of the puppet type, so called, and has for its object to produce a reliable and efficient valve which shall be practically liquid and gas tight in all positions, and which shall comprise so few parts, all inexpensive to make, and be so easy to assemble as to reduce the cost of construction to the minimum.

With these ends in view, I have devised a valve having a one piece body without cap or threads, other than the usual pipe connecting threads, and in which the valve stem shall be supported by a spider or guide, itself held in place by an expanding ring, so that the only machining operations required on the body are to finish the seat and to form a groove for the ring.

Figure 1:
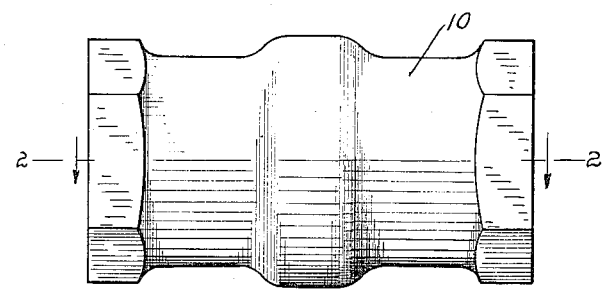
Figure 2:
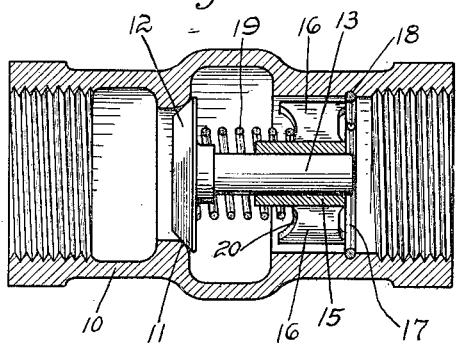

In the accompanying drawing forming a part of this specification, Figure 1 is an elevation of my novel valve;

Fig. 2 a longitudinal section thereof; and

Figure 3:
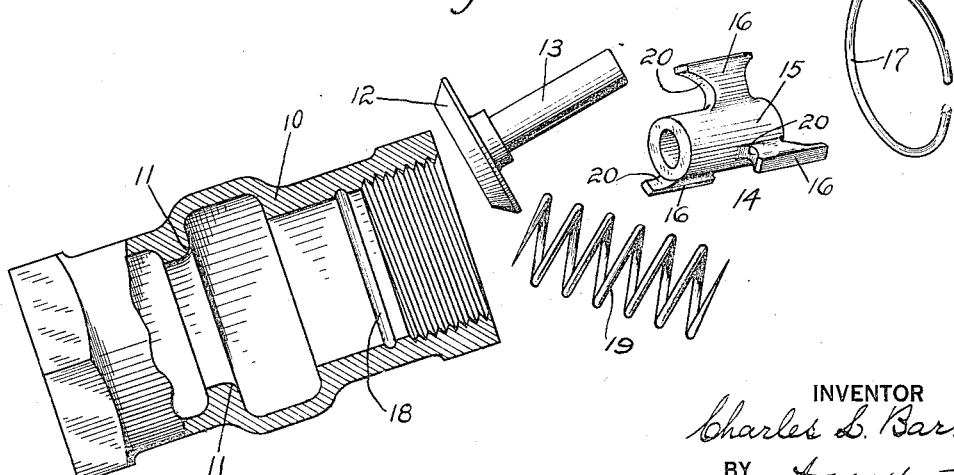

Fig. 3 is a view partly in section showing the parts disassembled.

10 denotes the body, which may be a casting or may be pressed or spun to shape, and which is provided with a straight opening through it, and is without integral bridges or fins. 11 denotes the seat which may be convex if preferred, 12 the disk, which lies at right angles to the axis of the body, the contacting face of which is finished on an angle, and 13 the stem by which the disk is carried, and which lies in horizontal alinement with the body. The valve is supported by a loose guide or spider 14 through which the stem passes, and which comprises a hub 15 and a plurality of webs or arms 16, which are adapted to contact with the inner wall of the body. The guide or spider is retained in place by an expanding ring 17, which engages an internal circumferential groove 18 in the body, the planes of the groove and the seat being parallel. A spring 19 bearing against the back of the disk and against the guide overcomes the weight of the valve and stem in any position and normally holds the valve seated. I have shown the webs and arms as provided with recesses 20, in which the end of the spring is seated.

In assembling, the spring is placed over the stem and the latter is inserted in the guide and then the parts are inserted in the body and held forward against the power of the spring, and the expanding ring is set to place and caused to engage the groove, thereby retaining the parts securely but removably in place.

Having thus described my invention, I claim:

1. A check valve of the character described comprising a body having a valve seat, a guide having radiating arms slidably engaging the wall of said body, and also having a hub extended beyond the wings to provide an elongated guide, a valve coöperating with said seat and having a stem passed through and slidably engaging said hub, an expansible abutment ring against which one end of said guide bears, and a spring interposed between said valve and the other end of said guide.

2. A check valve of the character described comprising a body having a valve seat and an internal circumferential groove spaced therefrom, a guide interposed between said groove and said valve seat and having radiating arms slidably engaging the wall of said body, said guide also having a hub extended beyond the wings to provide an elongated guide, a valve coöperating with said seat and having a stem passed through and slidably engaging said hub, an expansible abutment ring located within said groove and positioned to have one end of said guide abut thereagainst, and a spring interposed between said valve and the other end of said guide.

3. A check valve of the character described comprising a body having a valve seat, a guide having radiating arms slidably engaging the wall of said body, and also having a hub extended beyond the wings to provide an elongated guide, said arms being shaped at one end to provide curved spring-receiving seats at one end, a valve coöperating with said valve-seat and having a stem passed through and slidably engaging said hub, an expansible abutment ring against which the other end of said guide bears, and a spring interposed between said valve and said spring seats.

4. A check valve of the character described comprising a body having a valve seat, a removable guide provided with a central hub and radiating arms having a slidable engagement with the interior wall of said body, said hub being elongated to extend beyond said arms to provide a relatively long bearing, a valve coöperating with said seat and having a stem passed through said hub, and removable means for retaining said guide in place.

In testimony whereof I affix my signature.

CHARLES L. BARKER.